United States Patent
Ward et al.

(10) Patent No.: US 7,339,686 B1
(45) Date of Patent: Mar. 4, 2008

(54) SYSTEM AND METHOD FOR INTELLIGENT PRINT QUALITY SELECTION

(75) Inventors: Jefferson P. Ward, Brush Prairie, WA (US); Iranpour Khormaei, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 856 days.

(21) Appl. No.: 09/661,898

(22) Filed: Sep. 14, 2000

(51) Int. Cl.
*G06F 15/00* (2006.01)
*G06K 1/00* (2006.01)

(52) U.S. Cl. .................................. 358/1.13; 358/1.9

(58) Field of Classification Search .............. 358/462, 358/1.1, 1.9, 1.11–1.18; 347/5, 115; 399/124
See application file for complete search history.

(56) References Cited

U.S. PATENT DOCUMENTS

| | | | | |
|---|---|---|---|---|
| 5,227,894 A * | 7/1993 | Yoshida | ........................ | 358/441 |
| 5,455,895 A * | 10/1995 | Hattori | ........................ | 358/1.13 |
| 5,731,823 A * | 3/1998 | Miller et al. | .................... | 347/5 |
| 6,141,028 A * | 10/2000 | Aruga | ........................ | 347/193 |
| 6,149,323 A * | 11/2000 | Shima | ......................... | 400/76 |
| 6,204,867 B1 * | 3/2001 | Fujimoto et al. | ............ | 347/118 |
| 6,257,693 B1 * | 7/2001 | Miller et al. | ................... | 347/19 |
| 6,315,379 B1 * | 11/2001 | Adams et al. | ................. | 347/14 |
| 6,317,218 B1 * | 11/2001 | Yorkey et al. | ............. | 358/1.13 |
| 6,469,796 B1 * | 10/2002 | Leiman et al. | ............. | 358/1.15 |
| 6,614,550 B1 * | 9/2003 | Minagawa | .................. | 358/1.15 |
| 6,707,574 B1 * | 3/2004 | Freeman et al. | ............. | 358/1.9 |
| 6,757,081 B1 * | 6/2004 | Fan et al. | .................... | 358/474 |

OTHER PUBLICATIONS

Hewlett-Packard Company, U.S. Appl. No. 09/451,198, filed Nov. 29, 1999, entitled "Method for Selecting Default Printer Driver Settings".

* cited by examiner

*Primary Examiner*—Gabriel Garcia
*Assistant Examiner*—Thierry L. Pham

(57) ABSTRACT

A system and method are provided for intelligently selecting a print quality setting. Print quality selection logic automatically selects one of a plurality of print quality settings based on data relating to document content, prior print setting selections, user input and/or one or more characteristics of the current print request.

8 Claims, 3 Drawing Sheets

SYSTEM AND METHOD FOR INTELLIGENT PRINT QUALITY SELECTION

TECHNICAL FIELD

The present invention relates generally to intelligent print quality selection and, more particularly, to systems and methods that analyze one or more criteria to select a print quality setting.

BACKGROUND

Print quality is an important feature for printers of all types. The combination of the marking material, such as ink or toner, and the type of media being printed can have a significant effect on print quality. To address these different combinations, printers typically utilize different print processes that are optimized for particular types of media. The type of media being used, such as plain paper, transparencies, etc., may be sensed automatically by the printer or inputted by the user through the printer driver. With the media type information, the printer automatically selects the appropriate print process that is best suited for that media. The print process typically includes image processing techniques, such as halftoning, and other print parameters that are not accessible to a user.

Many printers also offer several user-selectable print quality settings, such as Draft, Normal and Best. An operator may select from the various print quality settings according to the quality and print speed desired. A default setting, such as Normal, is typically used whenever the user does not manually input a print quality setting. Given that printing speed generally decreases as print quality increases, the default print quality setting is a compromise between print quality and speed that is intended to meet the requirements of a range of printing requests.

In some common printing situations an operator would prefer to consistently use a print quality setting other than the default setting. For example, when printing email documents an operator may always desire to use a Draft print quality for maximum speed. Or when printing photographs the operator may desire to use a Best print quality setting for maximum quality.

In many current printers, to modify the print quality setting the user must open a printer driver dialog box and select a different setting. This process sometimes requires a user to click through multiple screens. Other printers allow the print quality setting to be adjusted via a keypad or touchscreen on the printer. Many users are either unaware of this print quality selection feature or do not take the additional time necessary to change these settings. For users who do utilize this capability, the time involved to manually change the default print quality setting slows the printing process.

It has also been discovered that offering a high number of print quality choices from which a user must manually select makes the printer more difficult to operate.

Additionally, the increasing need to print from personal appliances, such as cell phones and PDA's, presents new challenges to traditional print quality selection models. For example, the user interface in many appliances is not equipped to offer multiple quality levels, and a single default print quality setting is used for all print requests.

Thus, a need exists for an intelligent print quality selection system and method that address the limitations of the prior art.

SUMMARY OF THE INVENTION

The present invention provides a system and method for automatically selecting one of a plurality of print quality settings for printing a document. The method of the present invention can be broadly summarized by the following steps: analyzing a plurality of characteristics relating to the print request; identifying from a plurality of print settings an optimum print setting that is best suited for the plurality of characteristics; and utilizing the optimum print setting to print the document.

In another embodiment, the method may be broadly summarized by the following steps: determining a content characteristic of the document; identifying an optimum print setting from the plurality of print settings that is best suited for the content characteristic; and utilizing the optimum print setting to print the document.

In another embodiment, the method may be broadly summarized by the following steps: gathering data relating to prior print setting selections; comparing the prior print setting selection data to at least one characteristic of the print request; identifying an optimum print setting for the print request; and utilizing the optimum print setting to print the document.

In another embodiment, the method may be broadly summarized by the following steps: requesting a user to input at least one user preference; utilizing the user preference to identify from the plurality of print settings an optimum print setting that is best suited for the user preference; and utilizing the optimum print setting to print the document.

The present invention can also be viewed as providing a computer program product for executing the steps of the various embodiments described above. In one embodiment the computer program product may be broadly described as including code that analyzes a plurality of characteristics relating to the print request; code that identifies from the plurality of print settings an optimum print setting that is best suited for the plurality of characteristics; and code that utilizes the optimum print setting to print the document.

In another embodiment, the computer program product may be broadly described as including code that determines a content characteristic of the document; code that identifies an optimum print setting from the plurality of print settings that is best suited for the content characteristic; and code that utilizes the optimum print setting to print the document.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
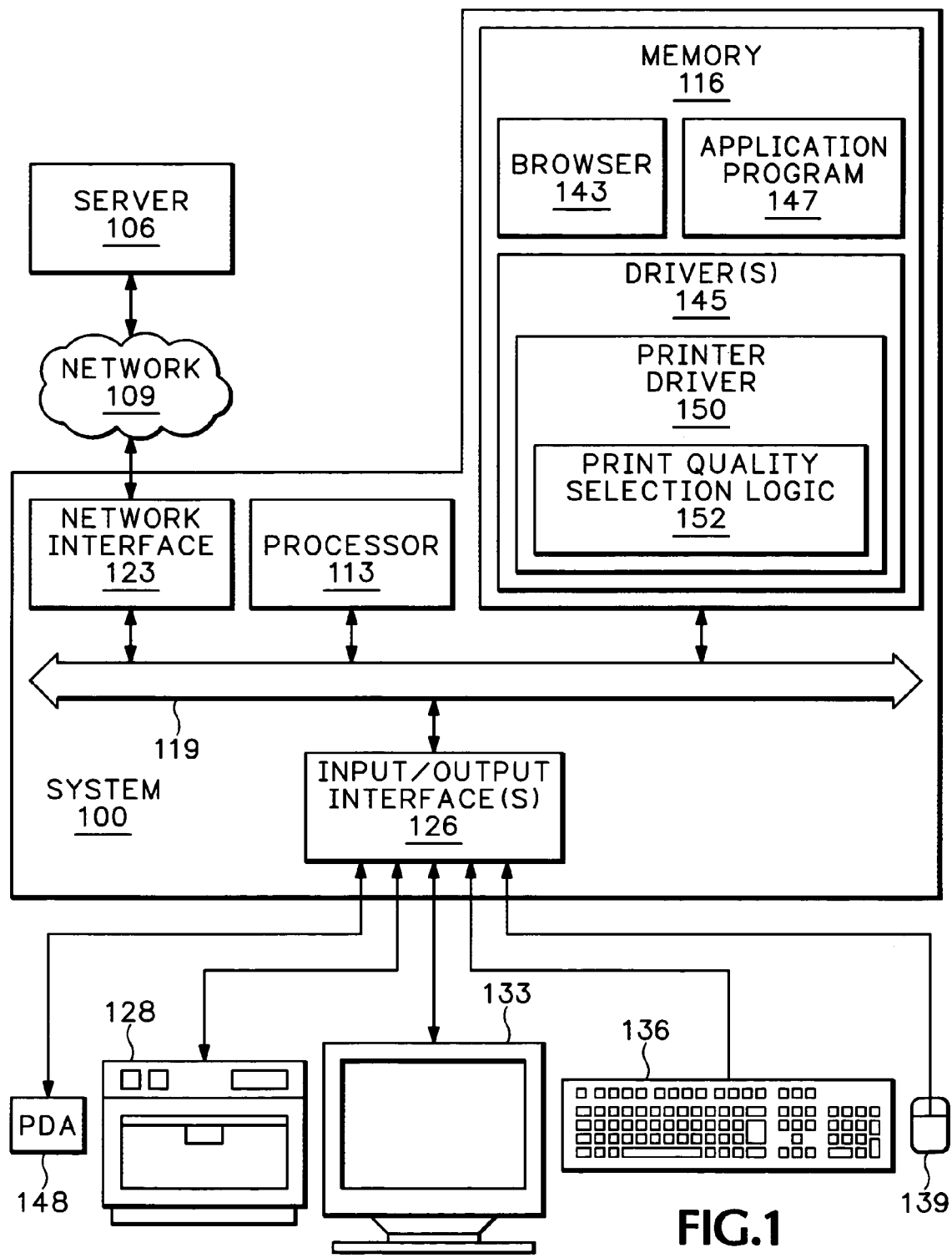
FIG. 1 is a block diagram of an exemplary system that may be utilized to select one of a plurality of print settings according to the present invention.

FIG. 1 schematically illustrates a block diagram of an exemplary system 100 for selecting one of a plurality of print settings according to one embodiment of the present invention. The system 100 may comprise, for example, a computer system as shown or a dedicated logical circuit that replaces the principle components of the computer system. In the preferred embodiment, the system 100 includes a processor 113 and a memory 116, both of which are electrically coupled to a local interface 119. The local interface 119 may comprise, for example, a data bus with an accompanying control bus as is known by those skilled in the computer art. The local interface 119 provides a conduit for the transfer of data between the various components attached to the interface.

The memory 116 may comprise any one of or a combination of a number of memory devices, including both volatile and nonvolatile memory components. Volatile components are those that do not retain data values upon loss of power. Conversely, nonvolatile components retain data upon a loss of power. These volatile and nonvolatile components may include, for example, random access memory (RAM), read-only memory (ROM), hard disk drives, floppy disk drives, compact disk drives, tape drives, and other memory components.

The system 100 includes one or more input/output interfaces 126. The input/output interfaces 126 may include, for example, an interface card or other similar device. The input/output interfaces 126 couple one or more input/output devices to the local interface 119. Such devices may include a printer 128, a display device 133, a digital appliance, such as a personal digital assistant (PDA) 148, a keyboard 136, and a mouse 139. These devices may be connected to the input/output interfaces 126 by cable or by a wireless connectivity protocol, such as infrared or RF communication.

One or more drivers 145 for communicating with the input/output devices are stored on the memory 116. Among the drivers 145 is a printer driver 150 configured for the printer 128. The printer driver translates a print job received from the processor 113 into a set of instructions that the printer 128 can understand. To print a document from an application program 147 running on the system 100, the application program sends a print job to the printer driver 150 via the processor 113. The printer driver 150 translates the print job and sends instructions to the printer 128 for execution.

The printer driver 150 may also include print quality selection logic 152 in accordance with the present invention. As explained in more detail below, the print quality selection logic 152 automatically selects one of a plurality of print quality settings based on data relating to document content, prior print setting selections, user input and/or one or more characteristics relating to the print request.

Figure 2:
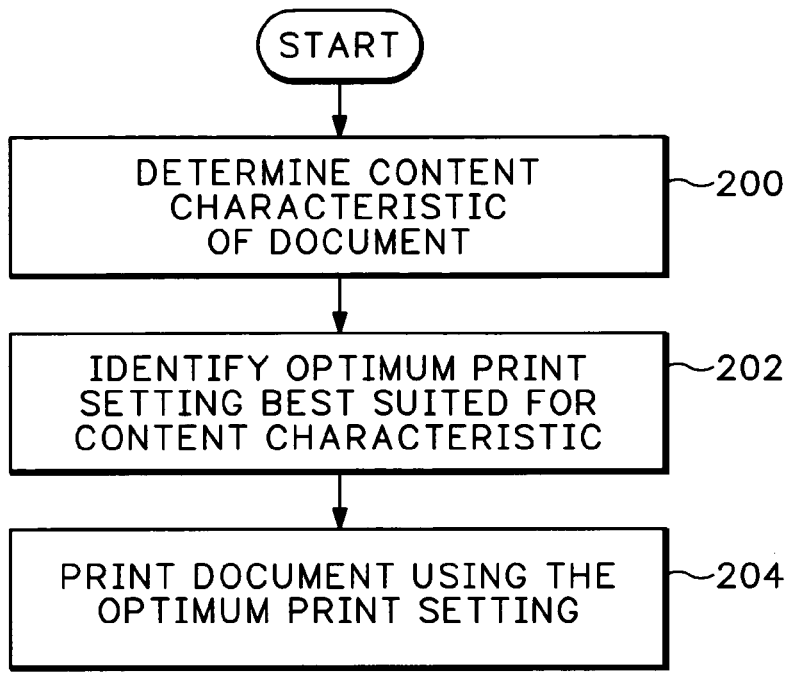
FIG. 2 is a flow chart of one embodiment of the method for selecting one of a plurality of print settings according to the present invention.

Turning now to FIG. 2, a flow chart of one embodiment of the system and method of the present invention is illustrated. Beginning with block 200, when a print request is executed the print quality selection logic 152 determines at least one content characteristic of the document to be printed. In block 202 the logic 152 then identifies from a plurality of print settings an optimum print setting that is best suited for the content characteristic. In block 204 the document is then printed using the optimum print setting.

With reference to block 200, a variety of document content characteristics may be examined by the print quality selection logic 152. For example, the document content characteristic can be related to the number of pages in the document. In one embodiment the number of pages of the document is compared to a threshold number. If the number of pages is less than or equal to the threshold, then the print quality selection logic 152 may select a first print setting that produces relatively high print quality at a slower print speed. If the number of pages is greater than the threshold, then the logic 152 may select a second print setting that increases printing speed while decreasing print quality. In determining whether the number of pages is greater than the threshold, it will be appreciated that all of the pages in the document may not be counted. For example, once the counting of the number of pages exceeds the threshold, no more pages need to be counted.

In another embodiment the document content characteristic may be related to the amount of text data in the document. For example, the amount of text data may be compared to a threshold amount. If the amount of text data is less than or equal to the threshold, then the print quality selection logic 152 may select a first print setting that produces relatively high print quality at a slower print speed. If the amount of text data is greater than the threshold, then the logic 152 may select a second print setting that increases printing speed while decreasing print quality.

In another embodiment the document content characteristic may be related to the amount of image data in the document. For example, the amount of image data may be compared to a threshold amount. If the amount of image data is less than or equal to the threshold, then the print quality selection logic 152 may select a first print setting that produces relatively lower print quality at a higher print speed. If the amount of image data is greater than the threshold, then the logic 152 may select a second print setting that provides greater print quality at a reduced printing speed.

In another embodiment, the print quality selection logic 152 may compare an amount of text data in the document to an amount of image data in the document. For example, if the amount of text data is greater than the amount of image data, then the print quality selection logic 152 may select a first print setting that produces relatively lower print quality at a higher print speed. If the amount of text data is equal to or less than the amount of image data, then the logic 152 may select a second print setting that produces higher print quality at slower print speeds.

In another embodiment, the document content characteristic may be related to the type of text data in the document. For example, if the document contains simple ASCII characters then the print quality selection logic 152 may select a first print setting that produces higher print speeds at a relatively lower print quality. If the document contains bit map characters then the logic 152 may select a second print setting that produces higher print quality at slower print speeds.

In another embodiment, the document content characteristic may be related to the type of image data in the document. For example, the print quality selection logic 152 may select a different print setting depending upon whether the document contains JPEG, .tif or .gif image data.

Figure 3:
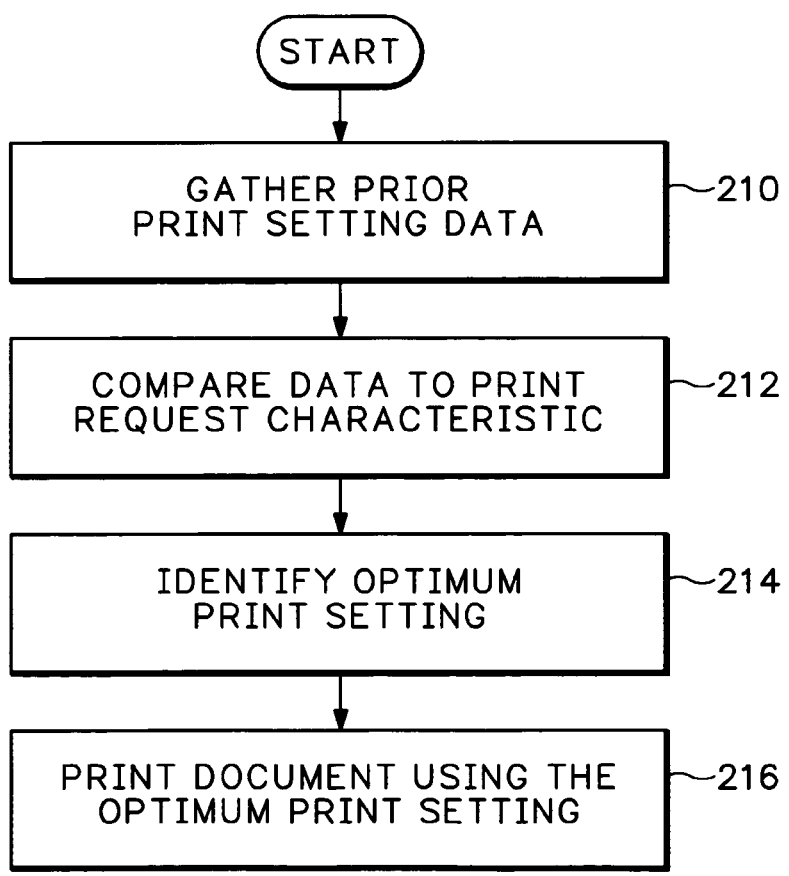
FIG. 3 is a flow chart of another embodiment of the method for selecting one of a plurality of print settings according to the present invention.

Turning now to FIG. 3, a flow chart of another embodiment of the system and method of the present invention is illustrated. Beginning with block 210, when the print request is executed the print quality selection logic 152 gathers data relating to prior print setting selections. In block 212 the logic 152 compares the data to at least one characteristic of the print request. In block 214 the logic identifies an optimum print setting that is best suited for the print request. In block 216 the document is then printed using the optimum print setting.

With reference to block 210, in one embodiment the logic 152 may examine prior print setting selections manually made by the user. This data may correlate each print setting selection with one or more characteristics of the print request that was processed. Examples of print request characteristics include a number of pages in the document, an amount of text data and/or image data in the document, a type of text data and/or image data in the document, an input/output protocol associated with the print request, a host device type, an application being used to print the document, a job queue status, a time of day of the print request and a type of media being printed. This prior print setting selection data may be collected over time and stored in the memory 116 of the system 100 or in memory onboard the printer 128 (see FIG. 1).

With reference now to block 212, the logic 152 may compare this historical data to a corresponding characteristic of the current print request to identify an optimum print setting. For example, if a Best print quality setting has been consistently used with prior print requests containing .gif image data, then the logic 152 may use the same Best print quality setting for future print requests containing .gif image data.

Figure 4:
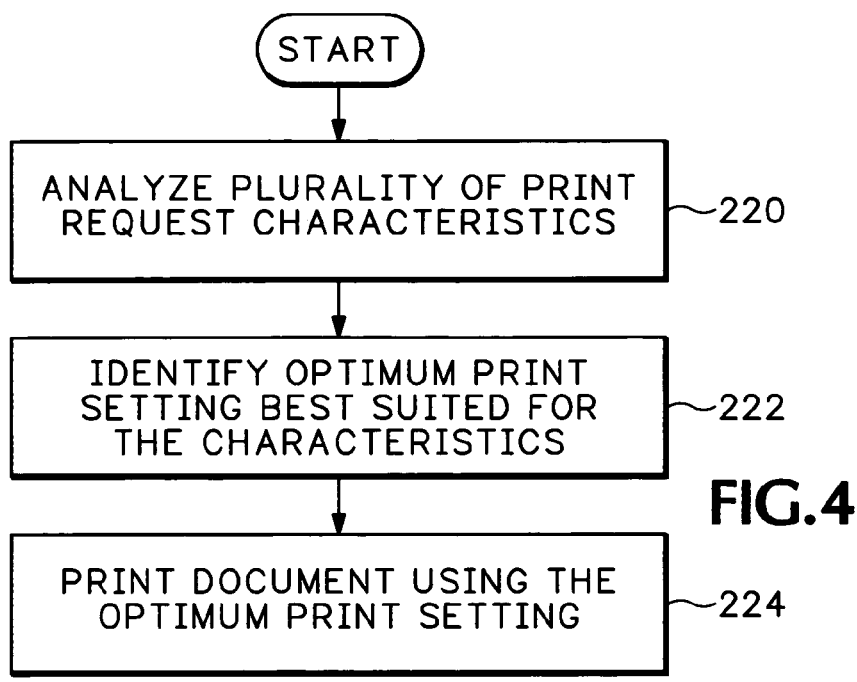
FIG. 4 is a flow chart of another embodiment of the method for selecting one of a plurality of print settings according to the present invention.

Turning now to FIG. 4, a flow chart of another embodiment of the system and method of the present invention is illustrated. Beginning with block 220, when the print request is executed the print quality selection logic 152 analyzes a plurality of characteristics relating to the print request. In block 222 the logic 152 identifies from the plurality of print settings an optimum print setting that is best suited for the plurality of characteristics. In block 224 the document is then printed using the optimum print setting.

With reference to block 220, examples of print request characteristics related to the content of the document include a number of pages in the document, an amount of text data and/or image data in the document and a type of text data and/or image data in the document. Examples of print request characteristics unrelated to the content of the document include the input/output protocol associated with the print request, such as 1384, infrared or RF communication, the host device type, such as a PC, laptop, or digital appliance, an application being used to print the document, a job queue status, a time of day of the print request and a type of media being printed.

With reference to block 222, in one embodiment two print request characteristics may be examined to identify the optimum print setting. For example, the two characteristics may be the type of text or image data in the document and the host device type. In one situation, the document may contain .gif image data. This type of data is associated with pictures or photographs, which are typically printed at higher print quality settings. If the host device is a PC, then the logic 152 may select a higher print quality setting under the assumption that the PC has a relatively fast processor to process the print job without significant delay. Alternatively, if the host device is a digital appliance, then the logic 152 may select a lower print quality setting under the assumption that the appliance has a slower processor that is better suited for processing less computationally intense print requests.

The print quality selection logic 152 may also request the user to input at least one preferred print setting to be used with one or more print request characteristics. For example, a user may prefer to always use a Best print quality when printing a document that contains .gif image data, regardless of the host device or other characteristics of the print request. The logic 152 may allow the user to input this preference.

The print quality selection logic 152 may also weight or prioritize the print request characteristics being analyzed according to at least one predetermined factor. One such factor may be the setting in which the printer is being used. If the printer is being used in a home setting where digital photographs are printed frequently, then print requests for documents containing .gif image data may be heavily weighted to using a Best print quality. However, if the printer is being used in an office setting where .gif images in presentations are printed frequently, then print requests for documents containing .gif image data may be weighted to using a Normal print quality.

Figure 5:
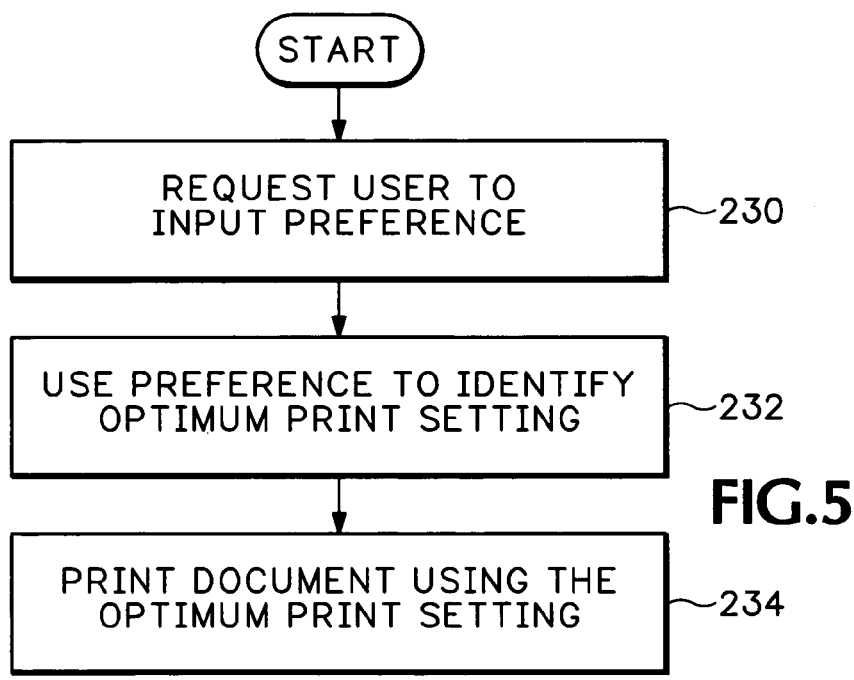
FIG. 5 is a flow chart of another embodiment of the method for selecting one of a plurality of print settings according to the present invention.

Turning now to FIG. 5, a flow chart of another embodiment of the system and method of the present invention is illustrated. Like one embodiment of the method of FIG. 4 described above, the method of FIG. 5 requests a user to input at least one user preference. However, the method of FIG. 5 may utilize a more general user preference that may be unrelated to a characteristic of the current print request. Beginning with block 230, the print quality selection logic 152 requests the user to input at least one user preference. In block 232 the logic 152 utilizes the user preference to identify from the plurality of print settings an optimum print setting that is best suited for the user preference. In block 234 the document is then printed using the optimum print setting.

Figure 6:
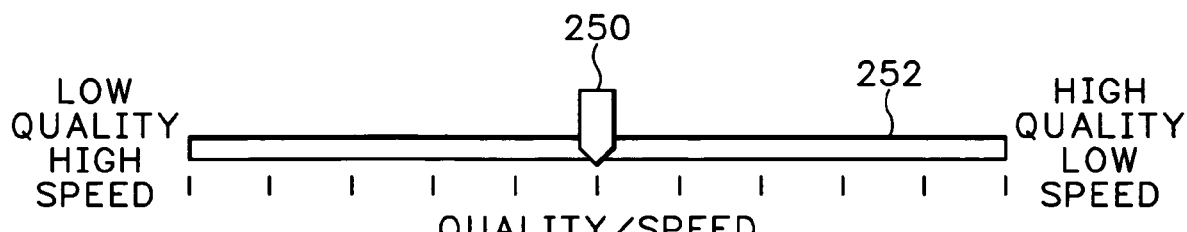
FIG. 6 is an illustration of a slider bar indicator that allows a user to input a quality/speed preference.

With reference to block 230, in one embodiment the user preference may be related to a general choice that balances print quality and print speed. With reference now to FIG. 6, in one embodiment the user may input this preference by adjusting a slider bar indicator 250 along a Quality/Speed continuum 252. If the user sets the indicator 250 near the Low Quality/High Speed end of the continuum 252, the print quality selection logic 152 will favor using a faster, lower quality print setting for all subsequent print requests. If the user sets the indicator 250 near the High Quality/Low Speed end of the continuum 252, the logic 152 will favor using a slower, higher quality print setting for all subsequent print requests. It will be appreciated that this user preference may be set long before the current print request is made. For example, the user may be prompted to input this preference when the printer driver is initially installed. The preference selected will then be applied to all subsequent print requests, and may later be modified as desired.

Referring back to FIG. 1, it will be appreciated that the print quality selection logic 152 may also reside remotely from the system 100. For example, the logic 152 may reside in software or firmware in the printer 128, in a plug-in that is downloaded from a network 109 via a network interface 123, on a server 106 or elsewhere on the network 109.

As described above, the various embodiments of the system and method of the present invention provide a distinct advantage by automatically selecting an optimum print quality setting based on data relating to document content, prior print setting selections, user input and/or one or more characteristics relating to the print request. Advantageously, a user is not required to manually select or change the desired print quality for each print request. Additionally, the present invention allows a printer manufacturer to utilize many more print quality settings than the traditional two or three settings without affecting the ease of use of the printer.

The print quality selection logic 152 of the present invention can be implemented in hardware, software, firmware, or a combination thereof. In one embodiment, the print quality selection logic 152 is implemented in software or firmware that is stored in a memory and that is executed by a suitable instruction execution system. If implemented in hardware, as in an alternative embodiment, the print quality selection logic 152 can be implemented with, but is not limited to, any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA) and a fully programmable gate array (FPGA).

The flow charts of FIGS. 2-5 show the architecture, functionality, and operation of possible implementations of the print quality selection logic 152 of the present invention. In this regard, each block represents a module, segment, or portion of code, that comprises one or more executable instructions for implementing the specified logical function(s). Note that in some alternative implementations, the functions contained in the blocks may occur out of the order noted in FIGS. 2-5. For example, two blocks shown in succession in FIGS. 2-5 may in fact be executed substantially concurrently or the blocks may sometimes be executed in the reverse order, depending upon the functionality involved.

The print quality selection logic 152, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer readable medium can be, but is not limited to, an electronic, magnetic, optical, electromagnetic, infrared or semiconductor system, apparatus, device or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical) and a portable compact disc read-only memory (CDROM) (optical). Note that the computer-readable medium could even be paper or another suitable medium upon which the program is printed. In such an embodiment the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A method, performed by logic on a printer driver and/or logic on a printer, of selecting one of a plurality of print settings for printing a current document comprising:
   the logic automatically gathering historical document data relating to prior print setting selections;
   the logic automatically correlating each prior print setting selection, including a user's prior print setting preferences, with one or more characteristics of the current document data;
   the logic automatically comparing the correlated print setting selections to one or more characteristics of the current document; and
   the logic automatically selecting a print setting from among the prior print settings, the selected print setting being best suited to the user's prior print setting preferences.

2. The method of printing of claim 1, further comprising the steps of:
   the logic automatically determining an amount of text data in the current document; and
   the logic automatically favoring a print setting associated with the current document based on the amount of text data and the user's prior print setting preference.

3. The method of printing of claim 1, further comprising the steps of:
   the logic automatically determining an amount of image data in the current document; and
   the logic automatically adjusting a print setting associated with the current document based on the amount of image data and the user's prior print setting preferences.

4. A method, performed by logic on a printer driver and/or logic on a printer, of selecting one of a plurality of print settings for printing a current document comprising the steps of:
   the logic automatically gathering prior document data relating to prior print setting selections including a user's preferred print setting associated with the prior document data;
   the logic automatically comparing the prior print setting selections and associated prior document data to at least one characteristic of the current document; and
   the logic automatically selecting a print setting for the document based on the comparison, the selected print setting being best suited to the user's preferred print setting associated with the prior document data.

5. A method of selecting one of a plurality of print settings for printing a current document comprising the steps of:
   automatically analyzing a plurality of characteristics relating to document data in the current document, the plurality of characteristics including a host device type, a type of text data, a type of image data, an infrared communication, and a radio frequency communication;
   automatically comparing the plurality of characteristics relating to document data in the current document with a user's prior print setting preference associated with prior documents having similar characteristics; and automatically selecting a print setting for the current document from the plurality of print settings based on the comparison.

6. The method of claim 5, further comprising the step of automatically weighting each of the plurality of characteristics according to at least one factor, including a factor associated with a physical setting in which the printer is being used.

7. A computer readable medium having instructions for causing a printing device to perform a method, comprising:

automatically analyzing a plurality of characteristics relating to document data in the current document, the plurality of characteristics including a host device type, a type of text data, a type of image data, an infrared communication, and a radio frequency communication;

automatically comparing the plurality of characteristics relating to document data in the current document with a user's prior print setting preference associated with prior documents having similar characteristics; and automatically selecting a print setting for the current document from the plurality of print settings based on the comparison.

8. The method of claim 5, further comprising the step of automatically weighting each of the plurality of characteristics according to at least one factor, including a factor associated with a user preference input that reflects a desired balance between print quality in the current document and speed of printing the current document.

* * * * *